United States Patent [19]

Husain

[11] Patent Number: 4,740,050
[45] Date of Patent: Apr. 26, 1988

[54] OPTICAL FAIL SAFE DEVICE

[75] Inventor: Anis Husain, Roseville, Minn.

[73] Assignee: Honeywell Inc., Minneapolis, Minn.

[21] Appl. No.: 395,518

[22] Filed: Jul. 6, 1982

[51] Int. Cl.⁴ .............................................. G02B 6/28
[52] U.S. Cl. ................... 350/96.16; 350/96.13; 350/96.10
[58] Field of Search .............. 350/96.12, 96.13, 96.14, 350/96.15, 96.16

[56] References Cited

U.S. PATENT DOCUMENTS

| | | | |
|---|---|---|---|
| 3,874,782 | 4/1975 | Schmidt | 350/96.11 |
| 3,976,358 | 8/1976 | Thompson | 350/96.13 |
| 4,023,887 | 5/1977 | Speers | 350/96.14 |
| 4,142,877 | 3/1979 | Auracher et al. | 350/96.15 X |
| 4,161,651 | 7/1979 | Sano et al. | 250/199 |
| 4,166,946 | 9/1979 | Chown et al. | 250/199 |
| 4,233,589 | 11/1980 | Rawson et al. | 455/612 |
| 4,246,475 | 1/1981 | Altman | 350/96.15 |
| 4,252,402 | 2/1981 | Puech et al. | 350/96.16 |
| 4,406,513 | 9/1983 | Raphael | 350/96.16 |

Primary Examiner—William L. Sikes
Assistant Examiner—Akm E. Ullah
Attorney, Agent, or Firm—William T. Udseth

[57] ABSTRACT

An output device is disclosed including a first light guide having an input port and an output port; a second light guide adapted to allow light to be inserted into said first light guide at a first location in said first light guide; means for absorbing light propagating through a second location in said first light guide, said second location being between said input port and said first location; and means for allowing the detection of information concerning light propagating in said first light guide, said means for allowing detection being located between said input port and said first location. Four embodiments are presented, each being integrated optical devices adapted to provide fail safe protection when used in a bus line system.

16 Claims, 2 Drawing Sheets

OPTICAL FAIL SAFE DEVICE

BACKGROUND OF THE INVENTION

1. Field of the Invention

This invention relates to fail safe optical devices, and more particularly to active fail safe optical devices which advantageously employ electro-absorptive devices to significantly attenuate light in a through path.

2. Pior Art

One of the basic building blocks of a conventional multi-drop optical bus system (whether a T-Bus or ring topology) is the T-Coupler. Light traveling along the bus line is diverted at a T-Coupler to a peripheral optically responsive device, data generated in such a device and the light returned to the bus line by use of electronics associated with the peripheral device.

Two types of T-Couplers, active or passive can be used. Passive T's ensure that light diverted to a peripheral unit will be returned to the bus line without reliance on the electronics of the peripheral units. Thus, truly passive T's have the advantage of being inherently fail safe. However, the number of hookups to the bus line is usually limited to usually under ten peripheral units (or terminals) due to the coupling loss associated with each such T-Coupler.

Active T's divert light in a bus line to optically responsive devices which rely on opto-electronics to ensure the return of diverted light to the bus line. The electronics of an active T can be used to compensate for the inevitable transmission losses by regenerating light coming into the T-Coupler. Such a regenerative device is called a repeater. Regeneration has the advantage of allowing virtually unlimited bus length except for systems considerations such as delay time introduced by the electronics and opto-electronics transducers.

Obviously a major disadvantage for the active T's is their dependence on electronics to ensure the continued propogation of light along the bus line and thus to other terminals farther down the line.

Active T's can be made fail safe by providing optical through paths from the input port to the output port of an active T that allow at least a fraction of the light on the bus line to continue along the bus line in the event of failure of the active T's electronics. Through paths can be formed by using a power divider inserted after light has been returned to bus line as shown in FIG. 1. This technique has a disadvantage that the power divider can produce back scattered light (as shown by the dashed line of FIG. 1) which in turn can seriously limit the total receiver to transmitter gain when the receiver and transmitter are simultaneously operated.

A fail safe optical T-Coupler is disclosed in U.S. Pat. No. 4,246,475 to Altman. Therein a passive, non amplifying light path is connected in parallel with a light energy amplifying means. The passive light path transmits light to the output of the T-Coupler at all times. In order to avoid undesirable destructive interference between light signals passing through the passive path and light signals propogating in the amplifying path, it is necessary that the passive path have an optical length that impresses a delay on light signals passing therethrough which is substantially equal to the optical delay imposed by transmission of light through the amplifying path.

Another T-Coupler is disclosed in U.S. Pat. No. 4,166,946 to Chown et al. Therein a by-pass arrangement is proposed at various terminal sites on a bus line. The by-pass consists of an optical fiber which allows some bus line light to pass the terminal site at all times. If the terminals are repeaters, the passive by-pass fibers are designed to have a considerable amount of attenuation. For non repeating terminals, most of the optical power is coupled into the by-pass. For repeating terminals, problems due to the delay difference between light signals in the by-pass fiber and light regenerated at a repeater terminal are addressed by suggesting that optical delay could be added to the by-pass line or by designing the by-pass fiber to further attentuate the by-pass signal. For non-repeating terminals, Chown assumed that the optical signals transmitted by each terminal site are sufficiently high and the distribution of repeaters along the bus line is sufficiently frequent to allow the original signals (i.e. the non by-pass signals) to swamp any by-pass signal at any particular location on the bus line.

In both Chown and Altman, it is clear that the through path (i.e. Altman's passive, non amplifying light path and Chown's by-pass fiber) is subject to severe limitations imposed by the requirement of matching the optical delay in the through path with the optical delay in the peripheral unit coupled to the T-Coupler. Further, Chown discloses attenuation of the light signal in the through path only by selecting optic fibers which inherently attenuate light signals. Thus, in Chown, the same attentuated signal will exit the through path at repeater terminals when the electronics of the repeater terminal fails as will exit the through path when the electronics of the repeater terminal does not fail. Also, Chown and Altman do not disclose devices integrable with an electro-absorptive substrate.

SUMMARY OF THE INVENTION

The present invention includes a first light guide having an input port and an output port, a second light guide adapted to allow light to be inserted into said first guide at a first location in said first light guide, means for absorbing light propogating through a second location in said first light guide, said second location being between said input port and said first location, and means for allowing the detection of information concerning light propogating in said first light guide, said means for allowing detection being located between said input port and said first location.

Four embodiments are presented. The embodiments are adapted to function as fail safe devices in an optical bus line. The embodiments are either adapted to couple to or include optically responsive units. The absorbing means serves to attentuate bus line signals in the first light guide when power is supplied to the devices. If the power to the devices fails, the absorbing means is automatically deactivated and the bus line signal is transmitted through the first light guide. If the electronics of an optically responsive unit coupled to or included in the device fails, the absorbing means can be deactivated. The first light guide thus serves as a through path.

The first embodiment provides a basic T-Coupler adapted for use with a variety of peripheral units. The second embodiment utilizes part of the absorbing means as part of a detection means. The third embodiment adds a light source coupled to the second light guide. The fourth embodiment functions as an optical repeater. All four embodiments are disclosed as integrated devices. The Franz-Keldysh effect is the preferred electro-absorptive effect employed by the absorption means.

DESCRIPTION OF THE PREFERRED EMBODIMENT

Figure 1:
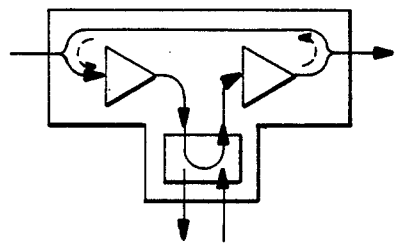
FIG. 1 is a schematic of a prior art active T-Coupler including a through path.
Figure 2:
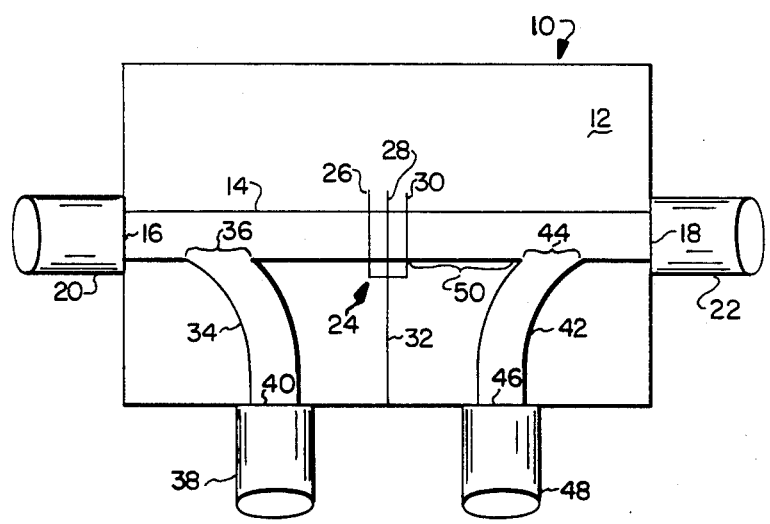
FIG. 2 is a schematic of a T-Coupler in accordance with the first embodiment.

T-Coupler 10 is the first embodiment of the present invention (see FIG. 2). An N-type gallium arsenide (GaAs) substrate is provided with (100) orientation and a $10^{18}cm^{-3}$ impurity concentration. A first light guide, such as waveguide 14 includes an input port 16 and an output 18. Waveguide 14 is also N-type with an electron concentration of $10^{13}cm^{-3}$. Waveguide 14 preferably forms a straight path across a surface of substrate 12. Optical fiber 20 is optically coupled to input port 16 and optical fiber 22 is optically coupled to output port 18. A means for absorbing light propogating in waveguide 14, such as Schottky diode 24 is included in T-Coupler 10. Schottky diode 24 includes, for example, three electrodes 26, 28 and 30 which are parallel and evenly spaced so that each spans the entire width of waveguide 14. Electrodes 26, 28 and 30 are electrically connected to a conductive means such as metallic strip 32. Electrodes 26, 28 and 30 are preferably of gold and, along with conductive strip 32, overlie or are in direct contact with diffused waveguide 14. Schottky diode 24 is positioned at the approximate midpoint of the length of waveguide 14.

A means for allowing the detection of information concerning light in waveguide 14, such as a second light guide (e.g. diffused waveguide 34), is adapted to allow the detection of such information at a location (such as region 36 wherein waveguides 14 and 34 intersect) between input port 16 and diode 24. Waveguide 34 is also N-type and of the same impurity concentration as waveguide 14. Optical fiber 38 is optically coupled to the output port 40 of waveguide 34. Generally, optical fiber 38 serves as a light path or "drop" to a detector means. Device 10 further includes another light guide such as diffused waveguide 42, which is adapted to allow light to be inserted into waveguide 14 at a location (e.g. region 44) between diode 24 and output port 18. Waveguide 42 has an input port 46 to which optic fiber 48 is optically coupled. Generally, optic fiber 48 serves as an optical return path from the peripheral unit or detector to which optical fiber 38 would input light. Waveguide 42 is also N-type and of the same concentration as waveguide 14.

For normal light guide action, the optical index of refraction of substrate 12 (i.e. $n_1$) must be less than the optical index of refraction of waveguides 14, 34 and 42 (i.e. $n_2$). Likewise, the optical index of refraction of air or any other medium that covers the exposed upper surfaces of diffused waveguides 14, 34 and 42, must be less than $n_2$.

In operation, device 10 receives light from optic fiber 20 through input port 16. The light is propogated along waveguide 14 with part of the optical energy being coupled into waveguide 34 at region 36. A reverse bias will be applied to Schottky diode 24 (i.e. a smaller voltage will be applied to electrodes 26, 28 and 30 by way of conductive strip 32 than is applied to substrate 12). Depending upon the voltage applied to diode 24, and due to the Franz-Keldysh effect, light propogating along waveguide 14 will be significantly attentuated at diode 24. Thus, virtually no light will enter region 50 of waveguide 14 between diode 24 and the region 44. Generally, the peripheral unit through which the light in waveguide 34 is transmitted, will extract data concerning the transmitted light and send an optical signal into device 10 by way of fiber 48. Light will return to device 10 through input port 46 and propogate through waveguide 42 to be inserted into waveguide 14 through region 44. The light will then continue along waveguide 14 through output por 18 and be transmitted through the output fiber 22 which is part of the bus line.

It is presumed that whatever peripheral unit is coupled to fibers 38 and 48, such peripheral unit includes electronics which can provide said reverse bias. Further, it is presumed that such electronics are adapted to eliminate said reverse bias in the event of their failure. Generally, this can be easily accomplished by using the peripheral unit's power supply and connecting the higher voltage to substrate 12 and the lower voltage to conductor strip 32. If the peripheral units supply fails, the reverse bias will then disappear. In that case, the electro-absorption afforded by Schottky diode 24 under reverse bias conditions will no longer occur and all light in waveguide 14 which is not coupled into waveguide 34 will be directly transmitted to output port 18. Since the electronics of the peripheral units have failed, generally no additional optical signal will be transmitted to output port 18 by way of fiber 48 and waveguide 42. Thus, a fail safe optical device, i.e. a T-Coupler is provided by the first embodiment.

Figure 3:
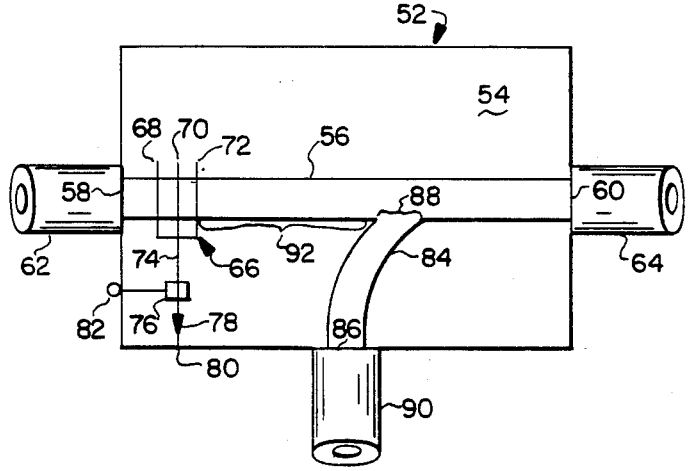
FIG. 3 is a schematic of a detector means and absorbing means partially incorporating the same elements in accordance with the second embodiment.

The second embodiment of the present invention is disclosed in device 52 (see FIG. 3). Therein a gallium arsenide substrate 54, which is the same kind as substrate 12, is provided. A first light guide, such as N-type diffused waveguide 56 with an electron concentration of $10^{13}cm^{-3}$, is included in the surface of substrate 54. Waveguide 56 has input port 58 and an output port 60. Optic fiber 62 is optically coupled to input port 58 and an output fiber 64 is optically coupled to output port 60. The means for absorbing light in waveguide 56 is provided again, by way of example, by a Schottky diode 66. Diode 66 is of the same configuration as diode 24 and includes electrodes 68, 70 and 72 and conductive strip 74. In device 52, however, the means for allowing the detection of information concerning light in waveguide 56 is provided by way of a decoupling circuit 76 rather than a light guide such as waveguide 34. In device 52, the decoupling circuit can, for example, include a capacitive means (not shown) adapted to pass only selected variations in electrical signals impressed on conductive strip 74 to terminal 80 by way of conductive means 78. Such variations in electrical signals will normally be due to modulation of light (and the light's associated electrical vector) propogating along waveguide 56.

In device 52 then, the means for absorbing light in waveguide 56 (i.e. diode 66) and the means for allowing the detection of information concerning light in waveguide 56 (i.e. diode 66, decoupling circuit 76, conductive means 78 and terminal 80) are both situated at the same location along waveguide 14. A second light guide, such as diffused waveguide 84 is provided in device 52. Diffused waveguide 84 is of the same impurity type and concentration as diffused waveguide 56. Waveguide 84 includes an input port 86 and is adapted to optically couple with waveguide 14 at region 88 at a point between diode 66 and output port 60. Input port 86 is optically coupled to input fiber 90. Generally, terminal 80 is adapted to operate a peripheral unit which in turn will generate a light signal to be input into waveguide 84 through optical fiber 90. As with device 10, the power supply in such a peripheral unit can be advantageously employed to provide the requisite reverse bias for diode 66.

In operation, device 52 will, due to said reverse bias on diode 66, significantly attenuate light propogating along waveguide 56 from input port 58. Likewise, said means for allowing the detection of information concerning light waveguide 56 allows for the extraction of data to operate in a peripheral unit. Thus, when diode 66 is reverse biased no significant optical signal will appear in region 92 of waveguide 56 between diode 66 and region 88. Said peripheral unit will generate an optical signal to be input at fiber 90 which is related, presumably, to the output data extracted at terminal 80 and such input optical signal will propogate along waveguide 84 and enter waveguide 56 at region 88. Said input optical signal will continue along waveguide 56 from region 88 and exit through output port 60 back into the bus line represented by output fiber 64. If the power supply of the peripheral unit connected to output terminal 80 fails, the reverse bias applied to diode 66 by way of terminal 82 and conductor strip 74 will disappear and the electro-absorptive effect supplied by reverse biasing diode 66 will also disappear. Then light input through input port 58 will not be significantly attentuated at diode 66 but instead will propogate directly to output port 60.

Figure 4:
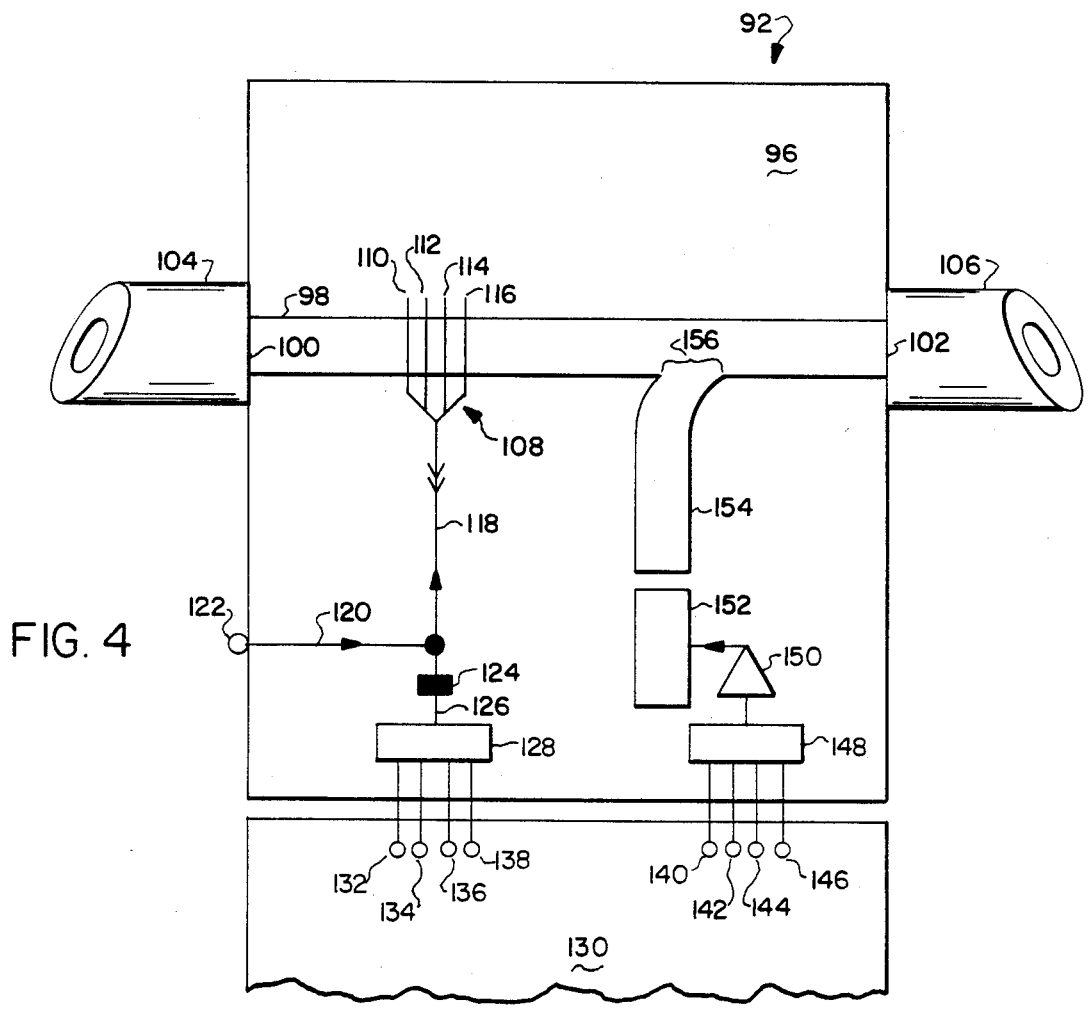
FIG. 4 is a schematic of a Y drop and insert optical device including an integrated light source in accordance with the third embodiment of the invention.

The third embodiment of the present invention ss disclosed in device 92, i.e. a fail safe drop and insert T (see FIG. 4). A gallium arsenide substrate 96, again preferably of (100) orientation, N-type and an impurity concentration of $10^{18}cm^{-3}$, is provided. Diffused waveguide 98 is formed in one surface of substrate 96 with an input port 100 and an output port 102. Input fiber 104 is optically coupled to input port 100 and output fiber 106 is optically coupled to output fiber 102. Waveguide 98 is of N-type impurity with an impurity concentration of $10^{13}cm^{-3}$. A means for absorbing light in waveguide 98, such as Schottky diode 108, is provided. Schottky diode 108 is of the same configuration as diode 66 except it includes 4 electrodes 110, 112, 114 and 116. Diode 108 includes conductive strip 118 which is connected by way of further conductor strip 120 to reverse bias terminal 122. A means for allowing the detection of information concerning light in waveguide 98, such as decoupling circuit 124, conductive means 126 and connecting means 128 is adapted to allow the extraction of information concerning light in waveguide 98 at the same location as diode 108. Decoupling circuit 126 could include the same components as the capacitive means circuit described in connection with device 52.

In device 92, said means for allowing the detection of light is employed to pass information concerning said light to an optically responsive integrated circuit (not shown) on a silicon chip 130 by way of contacts 132, 134, 136 and 138. Said optically responsive integrated circuit is adapted to generate electrical signals at contacts 140, 142, 144 and 146 to thereby input data to multiplexer 148. The output of multiplexer 148 is amplified by driver amplifier 150 and the output of amplifier 150 drives a light source 152, such as an integrated injection laser or LED. In turn, light source 152 is optically coupled to a second light guide, such as diffused waveguide 154, so that the output of light source 152 is inserted into waveguide 98 at a location between diode 108 and output port 102. Generally, waveguide 154 is the same impurity type and concentration as waveguide 98. Light generated by light source 152 then exits device 92 at output port 102 and enters the bus line as represented by output fiber 106.

In operation, diode 108 operates substantially the same as diode 66 and said means for allowing the detection of information concerning light in waveguide 98 (i.e. diode 108, decoupling circuit 124, conductive means 126 and connecting means 128) also functions substantially the same as said means for allowing the detection of information described with regard to device 52. Device 92 however integrates a light source directly with substrate 96 and the peripheral unit is an integrated circuit on chip 130. The power supply of the integrated circuit on chip 130 (or one of such power supplies) could be used to supply the reverse bias at terminal 122 to allow the electro-absorptive effect of reverse biased diode 108 to occur. Again, if such reverse bias fails, light entering waveguide 98 at input port 100 will pass directly out of device 92 at output port 102.

Figure 5:
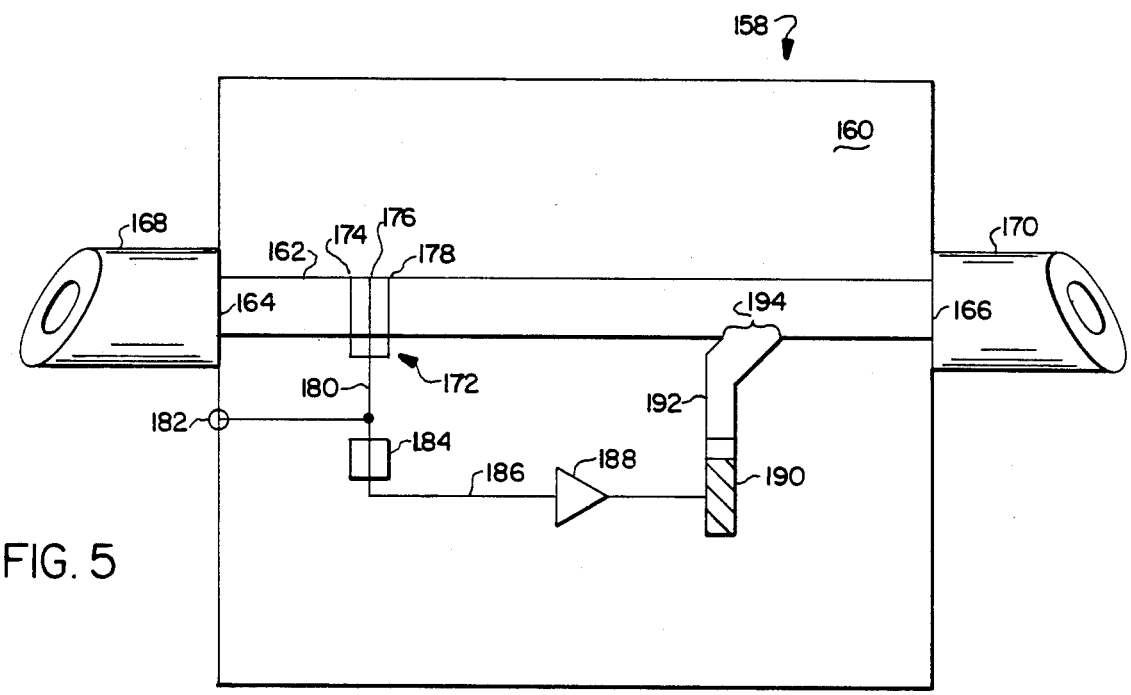
FIG. 5 is a schematic of an optical repeater in accordance with the fourth embodiment of the invention.

The final embodiment is disclosed in device 158 which is a fail safe integrated optic repeater (see FIG. 5). A substrate 160, which is the same as substrate 96, is provided with a light guide, such as waveguide 162 which is the same as waveguide 98. Waveguide 162 includes input port 164 and output port 166. Input fiber 168 is optically coupled to input port 164 and output fiber 170 is optically coupled to output 166. A means for absorbing light in waveguide 162 is provided, by way of example, by Schottky diode 172 which includes spaced parallel electrodes 174, 176 and 178, and by conductive means 180 and reverse biasing terminal 182. Means for allowing detection of information concerning light in waveguide 162 is provided, by way of example, by Schottky diode 172, conductive means 180 and decoupling circuit 184 which is adapted to function like decoupling circuit 76.

However for a repeater, the output data from decoupling circuit 184 is transmitted by way of conductive means 186 to a driver amplifier 188. The amplified output of driver 188 is input into a light source 190, such as an integrated injection laser or LED, and is adapted to cause light source 190 to emit light into light guide 192. Light guide 192 is preferably a diffused optical waveguide of the same impurity type and impurity concentration as waveguide 162. Light entering light guide 192 is inserted into waveguide 162 at region 194 between diode 172 and output port 166. Light entering waveguide 162 at region 194 will propogate along the remainder of waveguide 162 through output port 166 to a bus line (represented by output fiber 170). The electronics (not shown) employed to operate driver amplifier 188 can be adapted to supply the reverse bias to terminal 182 to provide the required electro-absorptive effect. Again, as with the other embodiments, if the electronics of driver amplifier 188 fail, the electronics would be adapted to delete the reverse bias applied to diode 172 and thus no absorption of light in waveguide 162 at the location of diode 172 will occur. Upon such failure, light entering waveguide 162 at input port 164 will directly pass through output port 166 without significant attentuation.

The invention herein has been disclosed in terms of integrated optical devices, however, it can be advantageously employed with fiber optics systems. The invention is, however, best employed with integrated single mode optical devices. With single mode devices shallow angles should preferably be provided at the intersection of waveguides.

The requisite attentuation to be provided by the absorption means will depend on the particular application of the invention herein. However, generally an attentuation of 30 dB is sufficient for most optical applications. Furthermore, other electro-absorptive phenomena than the Franz-Keldysh effect may be advantageously employed in the present invention. Further information on electro-absorptive phenomena, and in particular the Franz-Keldysh effect, which may assist in designing devices in accordance with the present invention for a particular purpose is provided in "Materials and Their Properties as They Apply to Electro-Absorptive Devices", N. Bottka, Optical Engineering, Volume 17 No. 5, September-October 1978, pp. 530–538, and "Electrobsorption in GaAs and its Application to Waveguide Detectors and Modulators", G. E. Stillman et al., Applied Physics Letters, Vol. 28, No. 9, May 1976, the same being incorporated herein by reference.

Likewise, many variations of the present invention are possible within the scope of the present invention which is defined solely by the claims herein. If integrated optical devices are employed, further information concerning the same may be found in *Integrated Optics*, D. Marcuse, IEE 1973, the same being incorporated herein by reference. If fiber optics are employed in the present invention, further information concerning fiber optics is provided in "Optical Communications Research and Technology: Fiber Optics", T. G. Giallorenzi, proceedings of the IEEE, Volume 66, No. 7, July 1978, the same being incorporated herein by reference. Further information on low-loss GaAs waveguide in integrated optical circuits is provided in "Low-Loss High-Purity GaAs Waveguides for Monolithic Integrated Optical Circuits at GaAs Laser Wavelengths", G. E. Stillman et al., Applied Physics Letters, Vol. 28, No. 4, February 1976, the same being incorporated herein by reference.

I claim:

1. An optical device, comprising:
   a substrate of a semiconductor material having a principal surface;
   a first light guide integral with said substrate and having an input port and an output port;
   a second light guide integral with said substrate and adapted to allow light to be inserted into said first light guide at a first location in said first light guide;
   means for absorbing light propogating through a second location in said first light guide, said absorbing means being responsive to an electrical signal, said second location being between said input port and said first location, and wherein said absorbing means includes a metallic material, said metallic material forming a metal-semiconductor junction with said light guide; and
   means for allowing the detection of information concerning light propogating in said first light guide, said means for allowing detection being located between said input port and said first location.

2. The device of claim 1 wherein said means for allowing the detection of information concerning light includes a third light guide optically coupled to said first light guide.

3. The device of claim 1 wherein:
   said first and second optical waveguides extend into said substrate from said principal surface;
   said metallic material spans the width of said first optical waveguide at said second location; and
   said means for allowing the detection of information concerning light includes said metallic material.

4. The device of claim 3 wherein said absorbing means includes means for reverse biasing said metal-semiconductor junction with a DC voltage.

5. The device of claim 3 wherein said means for allowing the detection of information concerning light is located at said second location, and further including means for detecting variations of the electric field in said metallic material due to light in said first optical waveguide, said detecting means being operatively associated with said means for allowing the detection of information concerning light.

6. The device of claim 5 wherein said metallic material includes a plurality of electrodes.

7. The device of claim 6 wherein said substrate is GaAs;
   said metallic material is gold; and
   said reverse biasing means is adapted to supply sufficient reverse bias so that the extinction ratio of light at said second location is at least 30 decibels.

8. The device of claim 7 wherein said first optical waveguide is adapted to operate as a single mode optical device.

9. The device of claim 3 further including:
   a light source integrated with said substrate and coupled to said second optical waveguide.

10. The device of claim 9 wherein said light source is a semiconductor injection laser.

11. The device of claim 9 further including means for detecting said information concerning light, said detecting means being operatively associated with said means for allowing the detection of information concerning light;
    means for amplifying said information; and
    means for controlling said light source with said amplified information.

12. The device of claim 11 wherein said amplifying means is a driver amplifier integrated with said substrate; and
    said means for controlling said light source is adapted to generate a light signal which is substantially the same as light entering said input port.

13. A method of providing fail safe protection in an optical device having a semiconductor substrate, comprising:
    passing a first light signal along a light guide having an input port and an output port, said light guide being integral with said substrate;
    reverse biasing a metal-semiconductor junction with an electrical signal, said junction being at a first region of said light guide;
    absorbing said first light signal at said first region;
    detecting information concerning said first light signal;

affecting an optically responsive device with said detected information, said optically responsive device including electronics;

inputting a second light signal which is related to the affect on said optically responsive device of said detected information into said light guide at a second region between said first region and said output port; and generating said electrical signal with said electronics, so that if said electronics fail, said electrical signal will terminate and said absorption will terminate.

14. The method of claim 13 wherein said detecting includes the further step of distinguishing a first portion of said information due to variations in the electric field of said light from a second portion of said information due to said reverse biasing.

15. The method of claim 14 wherein said absorbing provides an extinction ratio of light at said first location of at least 30 decibels.

16. An optical fail safe device, comprising:

a solid substrate of a semiconductor material;

first and second optical waveguides integral with said substrate, said first waveguide having an input port and an output port, and said second waveguide being adapted to insert light into said first waveguide at a first location between said input port and said output port;

means for sensing variations in the electric field associated with light in said first waveguide, said sensing means being positioned between said input port and said first location;

means for absorbing light in a portion of said first waveguide in response to an electrical signal, said absorbing means being positioned between said input port and said first location and including a metallic material which forms a metal-semiconductor junction with said first waveguide, wherein said electrical signal is supplied only when said sensing means is operative.

* * * * *